Patented May 10, 1927.

1,628,025

UNITED STATES PATENT OFFICE.

JENS ORTEN BOVING, OF LONDON, ENGLAND.

HYDRAULIC AIR-COMPRESSION PLANT.

Application filed September 1, 1925, Serial No. 53,812, and in Great Britain September 8, 1924.

This invention relates to hydraulic air compression plants of the type in which water, under the head due to difference of levels, inspires, entrains and compresses air in flowing down a shaft.

In particular the invention relates to the construction of the inlet for the water to the downcast shaft and to the means for introducing the air to the water at the inlet so as to be entrained thereby.

It has been the practice hitherto to admit the water to the downcast shaft by an inlet having a constricted mouth, usually annular, into which mouth air is drawn by the inflowing water usually from a number of pipes dipping beneath the surface of the water.

Now the constriction hitherto provided at the actual mouth of the inlet, whilst it imparts the necessary velocity to the water to cause the inspiration of the air, involves a considerable loss of head, and it is the object of the present invention to remedy this.

For this purpose, according to the invention, the inlet has a convergent-divergent Venturi section with a perforated walled constricted throat externally exposed to air and of such dimensions as to provide within the inlet a high velocity of water along a perforated area sufficient to inspire ample air through the perforations.

Air having been inspired, the velocity of the water becomes reconverted into static head in flowing down the divergent portion of the inlet which merges into the downcast shaft.

The air inspiring effect at the constricted throat of the inlet can be enhanced by arranging in the known manner the level at which the air is inspired above the level of the water, with the mouth of the inlet submerged, so that in addition to the inspiration of air due to the velocity of the water in the throat of the inlet, a suction effect due to the siphon action is also invoked to effect the inspiration of air.

In order to control the admission of air, the perforations of the throat of the inlet preferably communicate with a chamber to which air is admitted from the atmosphere past a regulatable valve.

Examples of inlets according to the invention are illustrated diagrammatically on the accompanying drawing, in which:—

Figure 1:
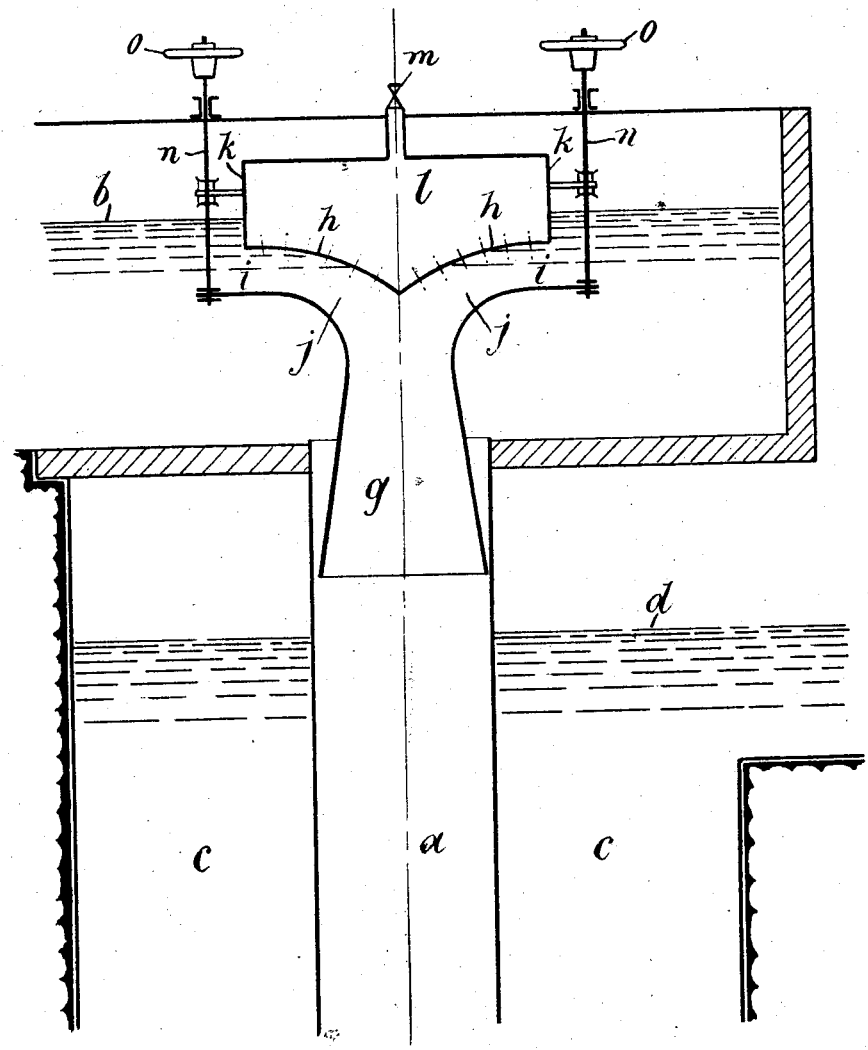
Figure 2:
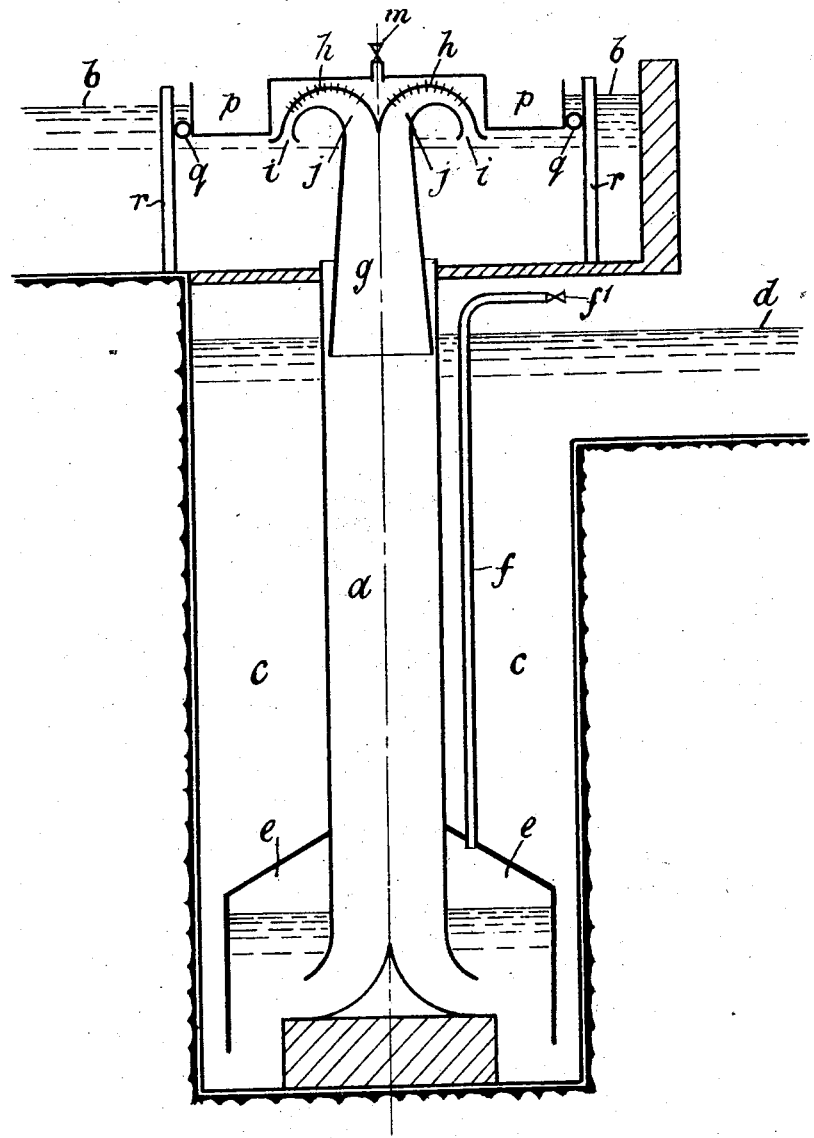

Fig. 1 is a sectional elevation of one form of construction of an inlet of Venturi section and the upper portions of the downcast and upcast shafts; whilst Fig. 2 is a sectional elevation showing an inlet of Venturi section with the throat above the level of the mouth, mounted on a float-supported inlet head, and also the entire downcast and upcast shafts and the air-trapping chamber at the bottom thereof.

$a$ is a shaft down which water flows from a level $b$ and ascends in the annular space in a shaft $c$, surrounding the shaft $a$, to escape at a level $d$.

The bottom of the downcast shaft $a$ terminates within a chamber $e$, Fig. 2, in which air entrained by the down-flowing water is trapped and subjected to the pressure head of the column of water in the upcast shaft $c$. The air thus compressed is led by a pipe $f$ controlled by a cock $f^1$ from the chamber $e$ for utilization for driving air turbines or the like.

The downcast shaft $a$ is extended upwards by a pipe $g$ telescoping therein, the flared upper end of which forms the lower portion of the inlet. The upper portion of the inlet is formed by a perforated plate $h$ shaped to present a concavely conoidal undersurface arranged centrally a short distance above the flared upper end of the pipe $g$, whereby an annular mouth $i$ and an annular throat $j$ are provided into which the water flows to descend the pipe $g$ and downcast shaft $a$.

Access of water to the space above the plate $h$ otherwise than through the perforations therein is prevented by an upstanding flange $k$ around the border of the perforated plate $h$.

The water flowing through the throat $j$ creates a suction which inspires air through the perforations in the plate $h$, to become entrained as bubbles in the water and carried therewith down the downcast shaft $a$.

To enable the inspiration of air to be controlled, the space within the flange $k$ above the perforated plate $h$ is enclosed to form a chamber $l$ to which air has access only by passing a regulatable valve $m$.

The inlet consisting of the mouth $i$, throat $j$ and pipe $g$ is of Venturi section, whereby, whilst water flowing along the underside of the perforated plate $h$ has the velocity necessary for inspiring air through the perforations, such velocity is converted into pressure head by flowing along the divergent pipe $g$.

Fig. 2 shows how, in addition to the inlet being of Venturi section, the throat $j$ can be arranged above the level of the mouth $i$, whereby a supplementary suction effect due to the resulting siphon action is created to assist in inspiring the air through the perforations.

The inlet head $g$, $h$, $k$, $l$ may be adjustably supported. For instance as shown in Fig. 1 the inlet head is suspended by screw threaded rods $n$ provided with hand-wheels $o$, whereby the inlet head can be raised or lowered. Also the degree of separation of the plate $h$ from the flared mouth of the pipe $g$ can be regulated by relatively adjusting same along the suspension rods $n$.

Alternatively, the inlet head may be float-suspended. For this purpose the inlet head may be rendered buoyant by being connected to a surrounding annular float chamber $p$ as shown in Fig. 2. The float chamber $p$ is guided by rollers $q$ running along upright guide posts $r$.

The inlet according to the present invention when in operation is always fully occupied by an unbroken column of water, eventually with entrained air bubbles, and the perforations are in direct contact with such column at its portion of greatest velocity.

Preferably the constriction at the throat is such that the velocity therethrough is at least 10% of the spouting velocity corresponding to the operating head of water, the sum total of the area of the perforations is less than $\frac{1}{10}$ of the area of the downcast shaft, and the individual air holes each are not more than $\frac{1}{8}$ inch in diameter.

I claim:

1. In a hydraulic air compression plant wherein down-flowing water inspires air, a downcast shaft, an upcast shaft, a water inlet pipe of Venturi section on said downcast shaft, and a perforated cover plate externally exposed to air on said inlet pipe.

2. In a hydraulic air compression plant wherein down-flowing water inspires air, a downcast shaft, an upcast shaft, a water inlet pipe of Venturi section on said downcast shaft, a perforated cover plate externally exposed to air on said inlet pipe, a closed chamber over said cover plate, and means regulating admission of air to said chamber.

3. In a hydraulic air compression plant wherein down-flowing water inspires air, a downcast shaft, an upcast shaft, a water inlet pipe of Venturi section on said downcast shaft, and a perforated cover plate externally exposed to air on said inlet pipe, said perforations being each within $\frac{1}{8}$ inch diameter and the sum total area of said perforations being less than $\frac{1}{10}$ of the area of said downcast shaft.

4. In a hydraulic air compression plant wherein down-flowing water inspires air, a downcast shaft, an upcast shaft, a water inlet pipe of Venturi section on said downcast shaft, a perforated cover plate externally exposed to air on said inlet pipe, said perforations being each within $\frac{1}{8}$ inch diameter and the sum total area of said perforations being less than $\frac{1}{10}$ of the area of said downcast shaft, a closed chamber over said cover plate, and means regulating admission of air to said chamber.

In testimony whereof I have signed my name to this specification.

JENS ORTEN BOVING.